United States Patent [19]
Sheppard

[11] 3,807,245
[45] Apr. 30, 1974

[54] LINKAGE SYSTEM

[75] Inventor: William L. Sheppard, Romulus, Mich.

[73] Assignee: AVM Corporation, Jamestown, N.Y.

[22] Filed: June 19, 1972

[21] Appl. No.: 263,863

[52] U.S. Cl.................... 74/102, 287/93, 287/101
[51] Int. Cl............................................ F16h 21/44
[58] Field of Search ................ 74/102; 287/93, 101

[56] References Cited
UNITED STATES PATENTS

| | | | |
|---|---|---|---|
| 212,380 | 2/1879 | Hitchcock | 74/102 |
| 1,742,626 | 1/1930 | Wilon | 74/102 |
| 3,276,606 | 10/1966 | Marchand | 74/102 |
| 445,401 | 1/1891 | Heath | 287/93 |
| 1,255,406 | 2/1918 | Gilbert | 287/101 |
| 1,142,979 | 6/1915 | Pelton | 287/93 |

FOREIGN PATENTS OR APPLICATIONS

| | | | |
|---|---|---|---|
| 922,959 | 7/1960 | Great Britain | 74/102 |
| 230,355 | 3/1925 | Great Britain | 287/101 |
| 1,183,745 | 12/1964 | Germany | 287/93 |

*Primary Examiner*—Benjamin W. Wyche
*Assistant Examiner*—Wesley S. Ratliff, Jr.
*Attorney, Agent, or Firm*—Harness, Dickey & Pierce

[57] ABSTRACT

A fluid valve particularly suited for controlling the flow of coolant in an automobile heater system and a vacuum responsive servo for actuating the valve. The valve has improved sealing means and the servo includes improved sealing of the diaphragm with respect to the servo actuating element and an improved two-piece servo housing. A novel connection between the servo and the valve is also provided, having reduced backlash and less tendency to bind.

14 Claims, 10 Drawing Figures

PATENTED APR 30 1974 3,807,245

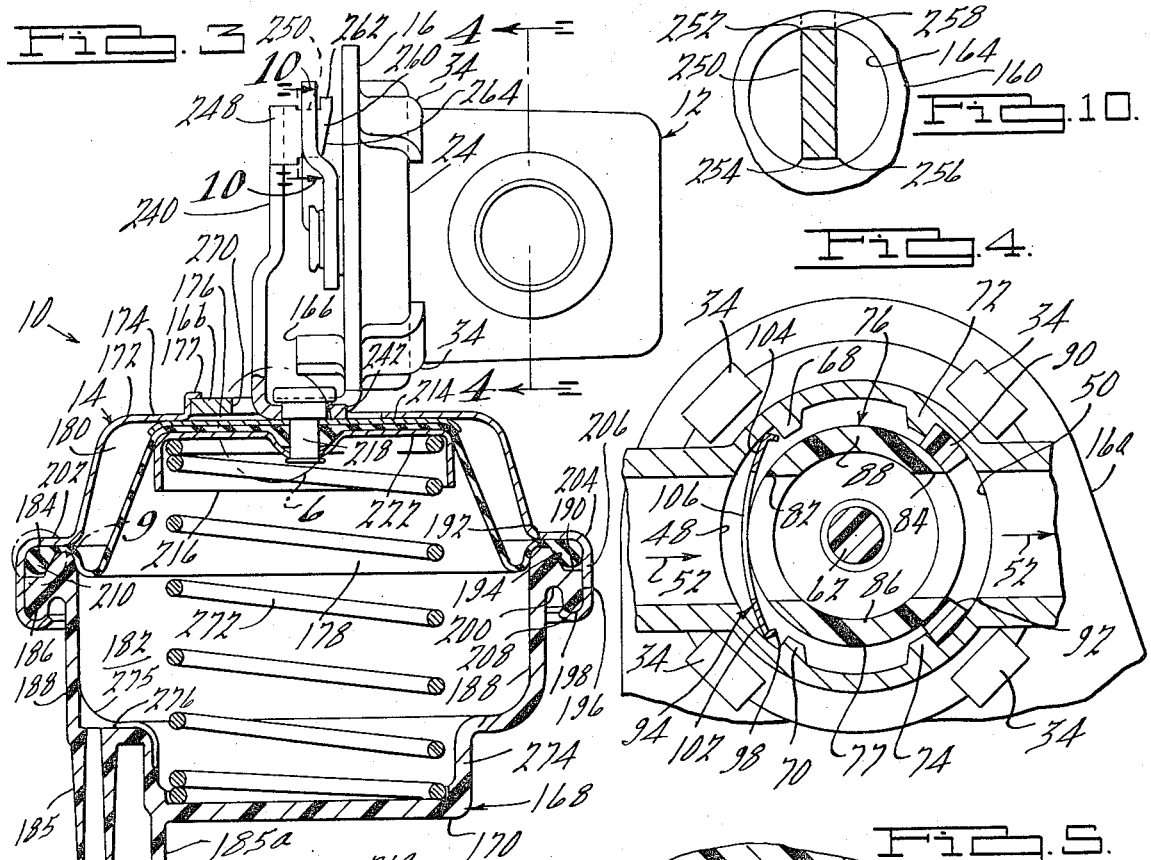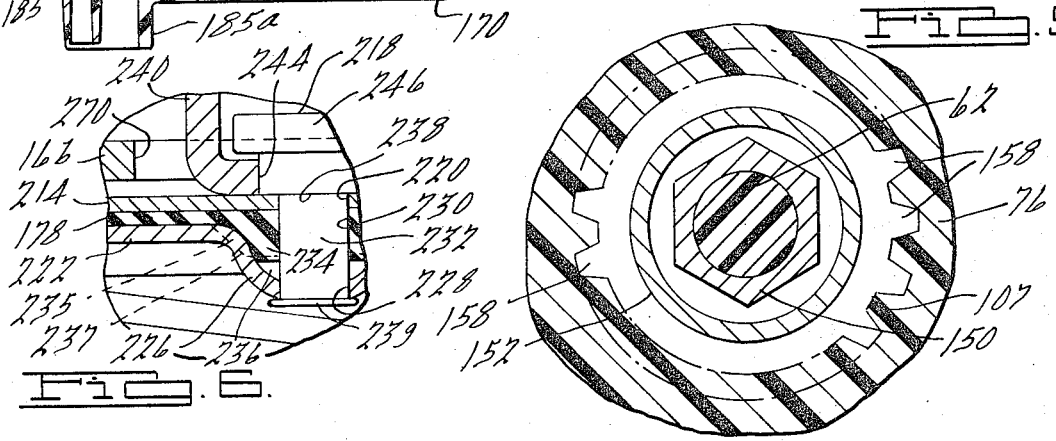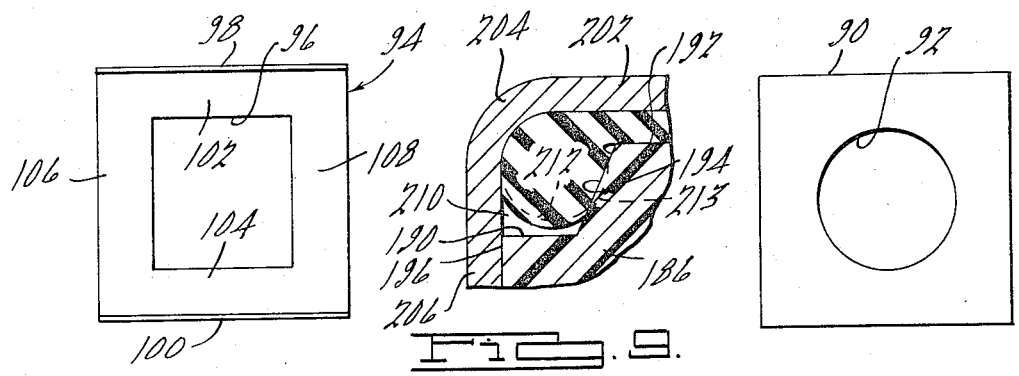

LINKAGE SYSTEM

BACKGROUND AND SUMMARY OF THE INVENTION

The present invention relates to a servo-actuated valve particularly suited for, although not limited to, use in automobile heating systems.

Heretofore, problems which individually and collectively have beset valves of this type, to various degrees, include: internal leakage preventing the valve from completely blocking fluid flow when closed especially at low fluid pressures and often caused by wear and foreign matter in the fluid; binding of the valve actuating mechanism and linkage preventing the valve from being smoothly and reliably actuated; the need for complicated manufacturing and assembly operations; relatively heavy weight often necessitating positive mounting to the vehicle by a separate mounting bracket; inability to consistently reliably operate over the temperature extremes to which subjected; poor sealing of the servo diaphragm to the servo actuator arm; and lack of strength in the servo housing when fabricated from inexpensive materials.

Accordingly, important objects of the present invention are to eliminate, or at least alleviate, the foregoing problems, including providing: a valve which is sufficiently lightweight that it can be hung directly in a heater hose line; an improved sealing arrangement for a valve in which resilient means continually biases the valve element into sealing engagement with the valve seat, which also uses the pressure of the input fluid to assist in sealing, which reliably closes even at very low fluid pressures and which is highly resistant to foreign matter and temperature variations; a valve which is relatively inexpensive and well-suited for mass production; an improved arrangement for interlocking the two halves of a vacuum servo housing which both strengthens the housing and seals the outer periphery of the servo diaphragm; a vacuum-tight seal for a servo diaphragm for preventing leakage around the connection of the servo actuator arm to the diaphragm; a simplified connection between the servo and the valve actuating member which requires no separate fastener, which minimizes backlash and any tendency to bind, which is easy to connect and which, once connected, cannot become disconnected during operation.

These and other objects, features and advantages of the present invention will become apparent from the subsequent description and the appended claims, taken in conjunction with the accompanying drawings.

BRIEF DESCRIPTION OF THE DRAWINGS

The accompanying drawings illustrate a preferred embodiment of the invention in accordance with the best mode presently contemplated for carrying out the invention.

FIG. 3 is a vertical sectional view taken along line 3—3 in FIG. 1.

FIG. 4 is an enlarged fragmentary horizontal sectional view taken along line 4—4 in FIG. 3.

FIG. 5 is an enlarged fragmentary horizontal sectional view taken along line 5—5 in FIG. 2.

FIG. 6 is an enlarged view taken in circle 6 of FIG. 3.

FIG. 7 is a plan view showing the valve spring of the unit by itself.

FIG. 8 is a plan view showing the valve seal by itself.

FIG. 9 is an enlarged view taken in circle 9 of FIG. 3.

FIG. 10 is an enlarged fragmentary horizontal sectional view taken along line 10—10 in FIG. 3.

DESCRIPTION OF THE PREFERRED EMBODIMENT

Figure 1:
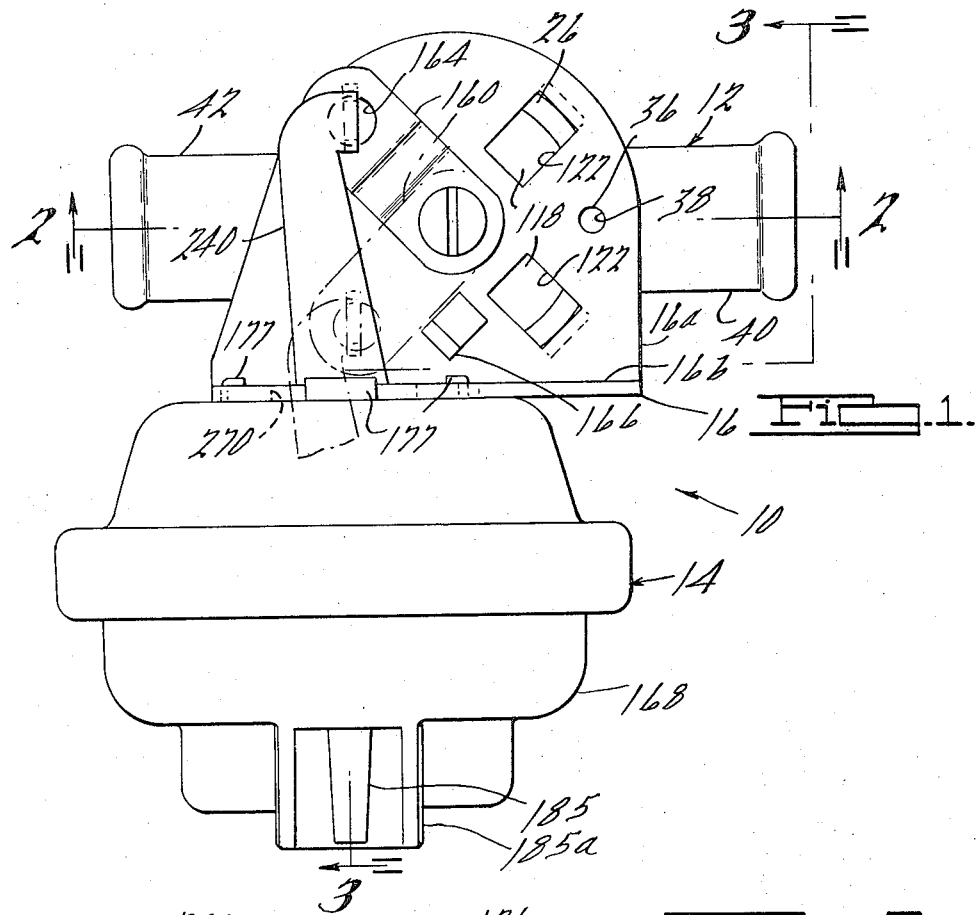
FIG. 1 is a top plan view of the servo-actuated valve unit of the present invention.

Looking first at FIGS. 1 and 3, the servo-actuated valve unit 10 of the present invention comprises water valve 12 and a vacuum servo 14. Valve 12 and servo 14 are mounted on a right angle metal bracket 16. As will be seen in greater detail hereinafter, the horizontal portion of bracket 16 forms a cover 16a for valve 12, and the vertical portion of bracket 16, a mounting flange 16b for mounting servo 14.

Figure 2:
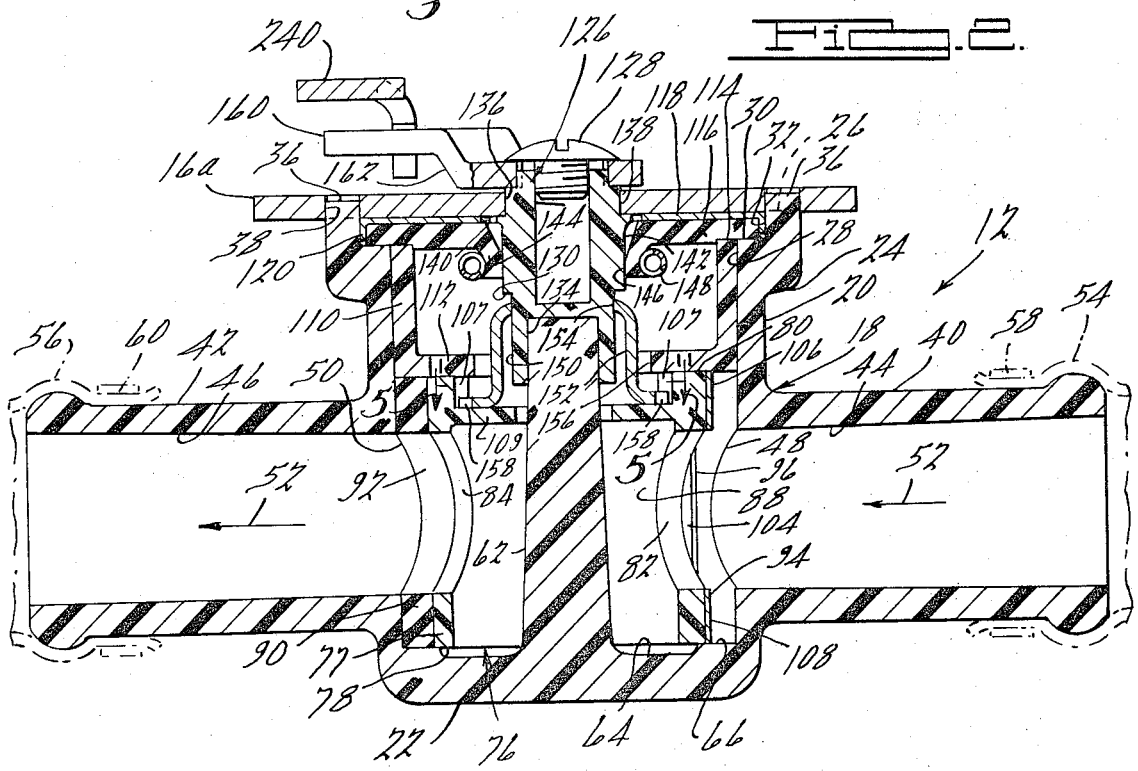
FIG. 2 is an enlarged vertical sectional view taken along line 2—2 of FIG. 1.

The details of valve 12 are best shown in FIGS. 2, 4 and 5. Referring in particular to FIG. 2, valve 12 comprises a one-piece plastic valve body 18 having a generally cylindrical side wall 20 enclosed at its lower axial end by a bottom wall 22. The upper axial end of side wall 20 is diametrically enlarged to form a shoulder 24 which extends continuously around the outside of wall 20 at a level below the circular upper end surface 26 of side wall 20. Side wall 20 defines a generally cylindrical bore 28 which extends upwardly from bottom wall 22 to an internal shoulder 30 which is formed by a counter bore 32 in the open upper end of side wall 20. Cover 16a covers the open upper end of side wall 20, and four depending legs 34 (FIG. 3) are struck out of cover 16a to mount body 18 thereon. Legs 34 are circularly arranged 90° apart around cover 16a and extend axially downwardly over the diametrically enlarged portion of side wall 20 and are turned radially inwardly around shoulder 24. A pair of small circular pins 36 on diametrically opposite portions of end surface 26 extend through corresponding holes 38 in cover 16a. Pins 36 serve both to properly locate cover 16a on body 18 during assembly and also to prevent cover 16a from being rotated on body 18 after assembly. Body 18 further includes a pair of aligned generally tubular nipples 40 and 42 which extend radially outwardly of side wall 20 on diametrically opposite sides thereof. Nipples 40 and 42 have generally tubular bores 44 and 46 respectively which intercept bore 28 to form orifices 48 and 50 respectively. As can be seen in FIG. 4, orifices 48 and 50 subtend arcs of slightly less than 60° about the axis of bore 28.

For reasons which will hereinafter become apparent, the preferable direction of flow through the valve is illustrated by the arrows 52. Accordingly, in the ensuing description, nipples 40 and 42 will be referred to as inlet and outlet nipples, respectively, and orifices 48 and 50 as inlet and outlet orifices, respectively. Unit 10 may be installed in the heater circuit of an automobile by inserting hoses, such as shown in broken lines at 54 and 56 in FIG. 2, over the beaded ends of nipples 40 and 42, respectively, and clamping them on the nipples by suitable hose clamps 58 and 60. Because of the lightweight construction of the unit, it may be wholly supported by the hoses if desired.

Body 18 further includes an upright, generally cylindrical post 62 which is co-axial with bore 28 and counter bore 32, but does not extend the full length of bore 28. An annular depression 64 is fashioned in bottom wall 22 around the base of post 62 having a diameter less than the diameter of bore 28 so that an internal radial ledge 66 is formed around the bottom of bore 28. As shown only in FIG. 4, body 18 also includes four axial ribs 68, 70, 72, and 74 which are circumferentially spaced about side wall 20 of bore 28. Ribs 68 and 70 are located on opposite sides of inlet orifice 48, being slightly circumferentially spaced therefrom. Likewise ribs 72 and 74 are located on either side of outlet orifice 50 and are similarly slightly circumferentially spaced therefrom. All four ribs extend upwardly from ledge 66 to a level somewhat vertically above the uppermost portion of the edges of orifices 48 and 50. While the upper terminus of the ribs is not readily apparent from the drawings, its location will be readily understood from subsequent description of the internal valve mechanism. From the foregoing description, it will be remembered that body 18 is a one-piece plastic unit. Accordingly, in manufacturing body 18, certain draft angles are often required in order to form certain structural features of the body. While certain of the above-described structural features of body 18 have been described as being generally cylindrical (e.g., side wall 20, and post 62) or generally tubular (e.g., nipples 40, 42), it will be appreciated that such items may have some draft and therefore, reference to an item as being generally cylindrical or generally tubular is intended to encompass a perfectly cylindrical or a perfectly tubular structure, respectively, and normally encountered deviations therefrom.

Turning now to the internal valve mechanism, a generally cylindrical, hollow plastic valve spool 76 having a generally cylindrical side wall 77 is disposed within bore 28 with at least a portion of its lower circular edge 78 resting on ledge 66. The axial dimension of spool 76 is slightly less than the axial dimension of ribs 68–74, but as can be seen in FIG. 2, the upper circular edge 80 of spool 76 is also disposed at a level somewhat above the uppermost portion of the edges of orifices 48 and 50. As shown in FIG. 4, the diameter of the cylinder defined by the radially inner surfaces of ribs 68–74 exceeds the diameter of spool 76, so that spool 76 can be displaced radially to a limited extent within bore 28. A pair of aligned generally circular orifices 82 and 84 are formed in diametrically opposite portions of side wall 77. Orifices 82 and 84 are substantially the same size as orifices 48 and 50. With valve 12 fully open as illustrated in the drawings, orifices 82 and 84 are aligned with orifices 48 and 50 to form a fluid passage through valve 12 between nipples 40 and 42. Orifices 82 and 84 subtend arcs of slightly less than 60° and therefore, the complementary solid portions 86 and 88 of side wall 77 which are adjacent orifices 82 and 84 subtend arcs of slightly more than 120°. To actuate valve 12 to the fully closed position, spool 76 is rotated 90° in the clockwise direction as viewed in FIG. 4 (and in the counterclockwise direction as viewed in FIG. 1) to position wall portion 86 over orifice 48 and wall portion 88 over orifice 50 and thereby stop the flow of fluid through the valve. As will be seen later in more detail, servo 14 actuates valve 12 between its fully open and fully closed positions.

One of the inventive features of the present valve is the seal which prevents leakage through the valve when closed. This seal preferably comprises a deformable, resilient sealing gasket 90 mounted on the wall of bore 28 between ribs 72 and 74 around outlet orifice 50. A central opening 92 is provided in gasket 90 in alignment with orifice 50. In its free state (shown in FIG. 8) gasket 90 is a simple flat square piece of resilient material of uniform thickness having smooth faces and a hole in the center. Gasket 90, which may be formed of a suitable elastomeric material, such as Buna-N rubber, is dimensioned so that when assembled to the wall of bore 28, it fits snugly between ribs 72 and 74 with its inner surface disposed radially inwardly of ribs 72 and 74 so that it is in sealing contact with side wall 77 of spool 76.

This sealing contact is maintained in all operative positions of the valve by means of a spring 94 disposed diametrically opposite gasket 90 between spool 76 and the wall of bore 28. Spring 94, which is preferably made from either phosphor bronze or stainless steel, is shown in its free state in FIG. 7. Spring 94 is a flat rectangular element having a central rectangular opening 96. Two opposite edges of spring 94 are flanged, as at 98 and 100, to form a pair of side elements 102 and 104 which are effectively bridged by flat resilient spring blades 106 and 108. When spring 94 is assembled into valve 12, side elements 102 and 104 extend axially of bore 28 and the bottom edge of blade 108 rests on ledge 66. Flanges 98 and 100 are circumferentially restrained by ribs 70 and 68 respectively and the overall spring dimensioned so that opening 96 does not restrict orifices 48 and 82. As best seen in FIG. 4, spring blades 106 and 108 are resiliently stressed or flexed between the wall of bore 28 and the side of spool 76 to resiliently bias the spool into a sealing relationship with gasket 90. It will be noted that only a small segment at the middle of each blade 106, 108 contacts side wall 77, blade 106 contacting side wall 77 above orifice 82 and blade 108 below orifice 82. Since spring 94 is circumferentially constrained by ribs 68 and 70 and approximately angularly centered with respect to orifice 48, blades 106 and 108 exert forces which are directed substantially radially of bore 28 and directly toward gasket 90. Spool 77 is of an outside diameter less than that of all adjacent parts of bore 28, including the axial ribs, so that it may float radially with respect to the bore.

Orifice 48 is preferably the inlet orifice so that inlet pressure will assist spring 94 in urging spool 76 toward orifice 50 and against gasket 90 in a sealing relationship therewith. With this arrangement, gasket 90 is continuously forcibly pressed between spool 76 and the wall of bore 28, the float of the spool facilitating optimum sealing engagement with gasket 90 at all times. Accordingly, when valve 12 is closed and orifice 50 is covered by spool wall portion 88, gasket 90 has a continuous peripheral sealing contact with and between wall portion 88 and the wall of bore 28 around orifice 50, which prevents fluid from leaking through the valve from inlet nipple 40 to outlet nipple 42. Because of the constant bias of spring 94, the excellent sealing ability of this valve is maintained over a long life throughout the range of temperature extremes to which the valve is typically subjected when in automotive use, and in such applications the seal is highly immune to contaminants, such as anti-freeze, cast iron particles, core dust, oil, rust sealer and the like.

Spool 76 is provided with a plurality of axial splines 107 (FIG. 2) on the upper inner surface of side wall 77. Splines 107 extend downwardly from upper end surface 80 to an annular shelf 109 which extends around the inner surface of side wall 77 just above orifices 82 and 84. As will be later seen, splines 107 operatively connect spool 76 with the spool actuating mechanism.

Spool 76 and spring 94 are axially retained within bore 28 by means of a cup-shaped plastic spacer 110 whose bottom end wall 112 rests on the upper ends of ribs 68–74 and also overlaps the upper end surface 80 of spool 76 and the upper edge of spring blade 106. Spacer 110 fits closely within bore 28 and the upper circular end surface 114 of spacer 110 is substantially flush with shoulder 30. A deformable, resilient annular sealing gasket 116 overlies spacer 110 with the outer peripheral margin of the gasket overlapping both end surface 114 of spacer 110 and shoulder 30. The outer diameter of gasket 116 is slightly less than the diameter of counter bore 32 and gasket 116 is retained by an overlying metal washer 118. Washer 118 fits closely within counter bore 32 and has a short down-turned peripheral flange 120 which circumferentially encompasses the outer peripheral edge of gasket 116. The thickness of the outer peripheral margin of gasket 116 is sufficiently great and the axial dimension of flange 120 sufficiently small relative to the axial dimension between edge 26 and shoulder 30 that with cover 16a mounted on the valve body, the outer peripheral margin of gasket 116 is deformed into a continuous peripheral sealing engagement with and around shoulder 30 and spacer 110 is urged downwardly against the upper ends of ribs 68–74. Thus, spacer 110 axially captures spool 76 and spring 94. However, the axial dimension of spool 76 is slightly less than the axial dimension of ribs 68–74 so that spool 76 will have a limited amount of axial movement, to avoid binding and provide float beneficial to sealing. It will also be observed that washer 118 completely covers the openings 122 which remain in cover 16a after legs 34 are struck from the cover so that the possibility of gasket material being extruded through openings 122 is substantially eliminated.

The actuating mechanism for spool 76 is best described with reference to FIGS. 2 and 5. Looking first at FIG. 2, a shaft 126 is journaled for rotation within bore 28 by a cylindrical axial bore 134 in its lower end. Bore 134 supports and journals shaft 126 on the upper end of post 62, which is preferably approximately circular to provide a suitable bearing surface. The other end of shaft 126 includes a slightly diametrically reduced circular portion 138 for journaling the shaft within a circular hole 136 in cover 16a. Shaft 126 extends through a suitable clearance hole 140 in washer 118 and has a cylindrical wall portion 142 below washer 118. The inner periphery 146 of gasket 116 is sealed against wall 142 by means of an axially extending annular sealing lip 144, the inner periphery 146 of which is preferably slightly less in its free state than the diameter of wall 142. Lip 144 is held in continuous peripheral contact around the shaft by means of a garter spring 148 disposed over and around the outer periphery of lip 144. This arrangement provides a fluid-tight seal around shaft 126 for all rotary operating positions of the shaft. The lower portion 150 of shaft 126, which is generally co-extensive with bore 134, has a transverse cross section polygonal in shape. This polygonal portion 150 keys shaft 126 to a thimble-shaped coupling 152. Portion 150 extends through a mating polygonal hole 154 in the top end wall of coupling 152 to connect coupling 152 for rotation with shaft 126, while providing an axial lost-motion connection so that coupling 152 can move axially of shaft 126. Coupling 152 extends through a suitable opening 156 in bottom wall 112 of spacer 110, and rests on shelf 109 of spool 76. An outwardly turned radial flange at the bottom of coupling 152 is fashioned with a plurality of radial teeth 158 which mesh with splines 107 on spool 76. This operative connection is shown in greater detail in FIG. 5 and permits lost motion between the spool and shaft assembly. It will be observed in FIG. 2 that upward axial movement of coupling 152 is limited by a shoulder 130 on shaft 126 and that splines 107 are of sufficient length to remain meshed with teeth 158 over the normal range of relative axial movement between coupling 152 and spool 76. The lost motion connection between shaft 126 and spool 76 essentially eliminates radial and axial loading on the spool and permits the float beneficial to sealing. The double journal of shaft 126 eliminates, or at least minimizes, shaft wobble and essentially precludes the possibility of shaft binding or bending when the valve is actuated.

An opening lever, or crank, 160 for rotating shaft 126 is attached to the external end of shaft 126 by a screw 128. The radially outer half of lever 160 is spaced somewhat above cover 16a by an intermediate bend 162 and a circular hole 164 is provided near the radially outer end of the lever for operatively connecting the lever with servo 14. With this arrangement, when lever 160 is operated in the counterclockwise direction in FIG. 1 from its solid line position to its broken line position, spool 76 is rotated 90° in the clockwise direction in FIG. 4 from the illustrated fully open position to the fully closed position (not illustrated). Counterclockwise rotation of lever 160 in FIG. 1 is limited by a stop 166 which is struck upwardly out of cover 16a.

Turning now to FIGS. 1 and 3, servo 14 has a two-piece generally cylindrical body 168 comprising a plastic shell 170 and a metal shell 172. Servo 14 is mounted on bracket 16 with the end wall 174 of shell 172 against flange 16b. Three retaining tabs 177 are struck out of end wall 174 around the periphery of an opening 176 in the wall for retaining servo 14 on bracket 16. The internal structure of servo 14, best shown in FIG. 3, includes a movable annular diaphragm 178, the outer periphery of which is securely anchored and sealed between shells 170 and 172 to divide body 168 into an atmospheric chamber 180 and a vacuum chamber 182. Chamber 180 communicates with atmosphere via opening 176 while chamber 182 communicates with a source of vacuum via a tubular nipple 185 integrally formed with shell 170. Nipple 185 is protected by a shield 185a which partially surrounds same.

As will be described in greater detail hereinafter, diaphragm 178 is movable axially of body 168 in response to the pressure of a vacuum in chamber 182 relative to atmospheric pressure and comprises a circumferentially continuous, deformable, resilient outer peripheral bead 184, which has a generally circular cross section when in its free state (FIG. 9). An overhanging, circumferentially continuous lip 186 extends around the outside of side wall 188 of shell 170 just below the open upper end of the shell. Lip 186 comprises a radially extending upper surface 190 which is spaced radially outwardly of and axially below the upper end surface 192 of side wall 188. An inclined surface 194 extends around the shell between the radially outer edge of surface 192 and the radially inner edge of surface 190. Lip 186 further comprises an axially extending side surface 196 which extends downwardly from the radially outer edge of surface 190. A convex surface 198 extends inwardly from the bottom edge of side surface 196 to the radially outer edge of a concave surface 200. The radially inner edge of concave surface 200 is connected to side wall 188. Metal shell 172 has a circumferentially continuous radial flange 202 which is generally radially co-extensive with surfaces 192 and 194 and the radially inner portion of surface 190. A circumferentially continuous curved bend 204 at the radially outer edge of flange 202 connects a circumferentially continuous axial flange 206 to flange 202. The inside diameter of shell 172 across flange 206 is slightly greater than the diameter of lip 186 across side surface 196. Flange 206 extends axially fully over lip 186, and a circumferentially continuous curled flange 208 on the lower edge of flange 206 is wrapped inwardly around lip surface 198 to interlock the shells. Bend 204 and the immediately contiguous portions of flanges 202 and 206 cooperate with lip surfaces 190 and 194 to form a continuous peripheral recess 210 around body 168 between the two shells. Bead 184 is deformably held within recess 210 to enseal the outer periphery of diaphragm 178 with shell 170.

It will be appreciated that preparatory to assembling the two shells, flange 208 is essentially a continuation of flange 206. The shells are interlocked by first inserting the open end of shell 172 over the open end of shell 170 until the peripheral margin of diaphragm 178 just inwardly of bead 184 is forcibly interengaged between flange 202 and end surface 192, with bead 184 being deformably held within recess 210. Flange 208 is then rolled or spun over lip 186 and wrapped around lip surface 198. After assembly of the shells, it will be observed that lip 186 has deformed bead 184 from its initial circular shape as defined in part by the broken line 212. More specifically, lip surface 194 has bodily displaced the portion of bead 184 identified by the numeral 213 so that bead 184 deforms to the illustrated shape. It will be observed that the cross sectional area of recess 210 exceeds the cross sectional area of bead 184 so that suitable space is provided within recess 210 to accommodate the deformation of bead 184, accounting for variations in normal manufacturing tolerances. As a result, the deformed bead 184 has a circumferentially continuous sealing contact around and with the open end of shell 170 to provide a fluid-tight outer peripheral seal for diaphragm 178 with shell 170. Bead 184 is dimensioned to maintain this sealing engagement in the event of any spring-back in flange 208 which might allow the deformed bead 184 to slightly relax and thereby cause some axial separation of the shells. Furthermore, because of the wrap-around relationship of metal shell 172 over plastic shell 170, the strength of the metal shell is imparted to the plastic shell thus minimizing distortion of the assembly under the influence of high pressure differentials and high temperatures.

The central region of diaphragm 178 is held between a metal diaphragm washer 214 and a metal diaphragm cup 216 by means of a rivet 218, as best shown in FIG. 6. Washer 214 is generally flat having a small circular hole 220 at its center and the generally flat end wall 222 of cup 216 is of approximately the same diameter as washer 214. A small circular dimple 226 is formed at the center of wall 222 and a small circular hole 228 extends through the dimple. The circular inner periphery 230 of diaphragm 178 is aligned with holes 220 and 228 and the shank 232 of rivet 218 passes through the three holes 220, 228, and 230. Diaphragm 178, washer 214 and cup 216 are held together by means of a shoulder 238 and a deformed, enlarged end portion 239 on rivet 218. A deformable resilient bead 234 extends continuously around the inner periphery of diaphragm 178. Dimple 226 cooperates with the overlying portion of washer 214 to form an annular recess 236 around rivet 218. The sandwiched retention of diaphragm 178 between washer 214 and cup 216 by means of rivet 218 causes bead 234 to be deformably contained within recess 236 to enseal the inner periphery of diaphragm 178 with rivet 218. With bead 234 so held, it will be observed in FIG. 6 that dimple 226 has deformed bead 234 from its free cross sectional shape as defined in part by broken line 237. More specifically, the portion of bead 234 identified by the numeral 235 has been bodily displaced with the resulting displacement thereof tending to force bead material radially inwardly around shank 232. The cross sectional area of recess 236 exceeds the cross sectional area of bead 234 so that suitable space is provided within recess 236 to permit the bead to deform to the shape illustrated, as in the case of bead 184. Thus, the inner periphery 230 of diaphragm 178 does not buckle or otherwise uncontrollably compress upon assembly of washer 214 and cup 216 to the diaphragm but rather deforms into a circumferentially continuous sealing contact around and with shank 218 to provide a fluid-tight inner peripheral seal for diaphragm 178.

A connecting rod 240 operatively connects diaphragm 178 with lever 160. The near end of rod 240 has a right-angled flange 242 attached to diaphragm 178 by rivet 218. A circular hole 244 in flange 242 fits around rivet 218 and is retained by the rivet head 246. The attachment is just loose enough so that rod 240 can rotate on rivet 218, such rotation being required to permit rod 240 to be properly oriented for connection to valve 12. The other end of rod 240 is interlocked with lever 160 by means of a down-turned tab 248. Tab 248 comprises an intermediate tab portion 250 disposed within hole 164 of lever 160. Tab portion 250 has a rectangular transverse cross section, best illustrated in FIG. 10. The major dimension, or length, of the cross section is substantially greater thann its minor dimension, or width. Tab portion 250 is dimensioned to fit closely within hole 164, with the four edges 252, 254, 256, 258, of portion 250 being disposed just within the edge of hole 164, and is disposed on rod 240 such that the length of its transverse cross section is substantially parallel to the length of the rod. Since rod 240 moves generally lengthwise upon operation of servo 14, the length of the transverse cross section of tab portion 250 is generally aligned with the direction of movement of rod 240. For a given dimension tab portion 250 and given diameter hole 164, such orientation of tab portion 250 relative to the direction of movement of rod 240 provides minimum free play and binding between rod 240 and lever 160 over the arcuate path of travel of the lever.

Tab 248 terminates in a free end portion 260 disposed beneath lever 160, and portion 260 interlocks rod 240 to lever 160 so that a separate attaching part such as a rivet is not required. Tab portion 260 comprises a projecting tip 262 disposed on the tab radially outwardly of the edge of opening 164 when the rod is connected to lever 160, and is fashioned as at 264 with sufficient clearance so that tip 262 can be inserted into hole 164 and the rod thereafter manipulated to bring intermediate tab portion 250 within opening 164. Before this connection can be made, however, lever 160 must be operated to its broken line position in FIG. 1. Servo 14 is then oriented so that rod 240 can be inserted through an opening 270 in flange 16b at a downwardly inclined angle toward valve 12. This inclination permits tip 262 to be inserted through hole 164 and beneath lever 160. Servo 14 is then swung downwardly about tab 248 with the clearance provided by the lower edge surface of the tab at 264 permitting tab end portion 260 to pass through hole 164 until the intermediate tab portion 250 lies within the hole. Servo 14 may then be attached to bracket 16.

With servo 14 operatively connected to valve 12 and both servo and valve mounted on bracket 16, valve 12 is biased toward the open position by a compression spring 272 within servo 14. One end of spring 272 seats within the interior of cup 216 while the other end of the spring seats within a seat 274 formed in the bottom of shell 170. Spring 272 biases diaphragm 178 toward end wall 174 with the interengagement of washer 214 and end wall 174 serving to limit the axially outward movement of the diaphragm. When vacuum is introduced into chamber 182 via nipple 185, the greater pressure in atmospheric chamber 180 forces diaphragm 178 downwardly within body 168 to compress spring 272 and cause rod 240 to rotate lever 160 until the valve is moved to its fully closed position. Although diaphragm 178 in this position completely covers seat 274 around the internal shoulder 275 between side wall 188 and seat 274, communication of vacuum chamber 182 with nipple 185 is maintained by a passage formed in shoulder 275. Thus, it is impossible for the diaphragm to seal itself into an inoperative position.

The advantages of the servo-actuated valve unit 10 of the present invention are particularly apparent when the unit is utilized in connection with an automotive heater system wherein the flow of coolant through valve 12 is controlled by a vacuum control signal supplied to servo 14. Due to the light weight of the unit, it may be possible to eliminate the usual attaching bracket and simply support the unit on hoses 54 and 56. Because vacuum chamber 182 is so well sealed, servo 14 develops maximum compressive force against spring 272 for a given intensity of vacuum signal. The reliable internal valve seal not only assures that there will be no leakage through the valve when the valve is closed, the bias developed by spring 94 forcibly pressing gasket 90 between spool 76 and the wall of the bore, but also does not hinder the operation of the spool between open and closed positions. The floating capability of spool 76 and the bias of spring 94 assures continuous fluid-tight sealing engagement of gasket 90 between the spool and the valve body even as the parts wear. Accordingly, the valve is intended to provide a long trouble-free life even under adverse conditions. While possessing the already enumerated as well as other advantages, the preferred embodiment moreover exhibits an economy of construction which renders it ideally suited for mass production.

Thus, there is disclosed in the above description and in the drawings an embodiment of the invention which fully and effectively accomplishes the objects thereof. However, it will be apparent that variations in the method may be indulged in without departing from the sphere of the invention herein described, or the scope of the appended claims.

What is claimed is:

1. Actuating means comprising: a rotary crank for operating a valve or the like; means defining a hole in said crank, the axis of said hole being parallel to and offset from the axis of rotation of said crank, said hole having a continuous circular edge; means for operating said crank over a predetermined arcuate path less than 180° about its axis comprising a generally linearly movable powered actuating member; a tab on said member disposed within said circular hole, said tab having a rectangular cross-section in a plane perpendicular to the axis of said hole with the major dimension of said rectangular cross-section being substantially greater than the minor dimension thereof, said cross-section being dimensioned such that the four corners thereof just clear the edge of said hole, said tab being disposed on said actuating member with said major dimension generally aligned with the direction of movement of said actuating member as it operates said crank.

2. Actuating means as claimed in claim 1, wherein said arcuate path of travel of said crank is approximately 90°.

3. Actuating means as claimed in claim 1, further comprising locking means on said tab for interlocking said tab with said crank.

4. Actuating means as claimed in claim 3, wherein said locking means comprises a projecting tip on said tab disposed on the opposite side of said crank from said actuating member and extending beyond the edge of said hole.

5. Actuating means as claimed in claim 4, wherein said tip projects radially outwardly from said hole in the plane of said transverse dimensions.

6. Actuating means as claimed in claim 1, wherein said tab is integral with said actuating member.

7. Actuating means comprising: a rotary crank member for operating a valve and the like; a generally linearly movable actuating member for operating said crank member; and coupling means operatively coupling said actuating member and said crank member comprising means defining in one of said members a hole having a continuous periphery, said hole being spaced from the axis about which said crank member rotates, a tab on the other of said members projecting from said other member and having a tab portion disposed within said hole, said tab portion having a rectangular cross-section in a plane perpendicular to the axis of said hole with the major dimension of said rectangular cross-section being substantially greater than the minor dimension thereof, said cross-section being dimensioned such that the four corners thereof just clear the periphery of said hole, said actuating member being movable to rotate said crank member via said coupling means.

8. Actuating means as claimed in claim 7 further comprising locking means on said tab for preventing removal of said tab portion from said hole if said tab portion is displaced axially with respect to said hole.

9. Actuating means as claimed in claim 8 wherein said locking means comprises a projecting tip on said tab projecting away from said tab portion and beyond the edge of said hole.

10. Actuating means as claimed in claim 9 wherein said projecting tip and said tab are arranged and constructed to permit said one member to incline relative to said other member away from the usual operatively coupled position thereof and permit said projecting tip to clear said hole so that said tab and projecting tip may then be displaced axially through said hole to uncouple said two members.

11. Actuating means as claimed in claim 10 wherein said hole is formed in a flat section of said one member.

12. Actuating means as claimed in claim 9 wherein said projecting tip lies in the plane of said tab portion and has a dimension greater than the diameter of said hole in the direction of the major dimension of said rectangular cross-section.

13. Actuating means comprising: a first member having a tab thereon; a second member having means defining a circular hole therein; said tab projecting away from said first member and extending through said hole, the portion of said tab disposed within said hole having a rectangular cross-section in a plane perpendicular to the axis of said hole with the major dimension of said rectangular cross-section being substantially greater than the minor dimension thereof, said cross-section being dimensioned such that the four corners thereof just clear the edge of said hole, said tab including a projecting tip projecting away from the portion of said tab disposed within said hole and beyond the edge of said hole on the side of said hole opposite said first member, said tab being arranged and constructed so as to permit said two members, when operatively uncoupled from each other, to be operatively coupled together by initially inserting said projecting tip through said hole and then swinging said two members relative to each other to lodge the rectangularly cross-sectioned portion of said tab within said hole.

14. Actuating means as claimed in claim 13 wherein said hole has a continuous circular edge.

* * * * *